United States Patent
Bozio et al.

(10) Patent No.: US 9,707,708 B2
(45) Date of Patent: Jul. 18, 2017

(54) ILLUMINATED CUP HOLDER WITH LIGHT TRANSMISSIVE LINER

(71) Applicant: Johnson Controls Technology Company, Holland, MI (US)

(72) Inventors: Ronald A. Bozio, Holland, MI (US); Scott A. Hansen, Holland, MI (US); Jason M. Hipshier, Hudsonville, MI (US)

( * ) Notice: Subject to any disclaimer, the term of this patent is extended or adjusted under 35 U.S.C. 154(b) by 93 days.

(21) Appl. No.: 14/424,609

(22) PCT Filed: Aug. 29, 2013

(86) PCT No.: PCT/US2013/057283
§ 371 (c)(1),
(2) Date: Feb. 27, 2015

(87) PCT Pub. No.: WO2014/058544
PCT Pub. Date: Apr. 17, 2014

(65) Prior Publication Data
US 2015/0210211 A1    Jul. 30, 2015

Related U.S. Application Data

(60) Provisional application No. 61/695,823, filed on Aug. 31, 2012.

(51) Int. Cl.
*B60Q 3/02* (2006.01)
*B29C 45/16* (2006.01)
(Continued)

(52) U.S. Cl.
CPC .............. *B29C 45/16* (2013.01); *B60N 3/106* (2013.01); *B60Q 3/20* (2017.02); *B60Q 3/64* (2017.02);
(Continued)

(58) Field of Classification Search
CPC .................................................... B60C 3/0243
See application file for complete search history.

(56) References Cited

U.S. PATENT DOCUMENTS 5,060,899 A * 10/1991 Lorence ................. B60N 3/102
                                                           224/401
5,297,767 A *  3/1994 Miller ..................... A47C 7/70
                                                           224/275
(Continued)

FOREIGN PATENT DOCUMENTS

DE   102005035282    2/2007
DE   102009023445    1/2010
(Continued)

OTHER PUBLICATIONS

English translation of Summary of Notice of Reasons for Rejection for Japanese Patent Application No. 2015-530036 dated Apr. 11, 2016.
(Continued)

*Primary Examiner* — Ismael Negron (57) ABSTRACT

A cup holder assembly includes a liner configured to support a beverage container and a resilient element with a light transmissive element formed within the liner and configured to receive light from a light source to illuminate an inner surface of the liner.

10 Claims, 7 Drawing Sheets

(51) Int. Cl.
  *B60N 3/10* (2006.01)
  *B60Q 3/64* (2017.01)
  *B60Q 3/20* (2017.01)
  *B29K 21/00* (2006.01)
  *B29L 31/30* (2006.01)
(52) U.S. Cl.
  CPC . *B29K 2021/003* (2013.01); *B29L 2031/3005* (2013.01)

(56) References Cited

U.S. PATENT DOCUMENTS

| | | | | |
|---|---|---|---|---|
| 7,708,436 | B2* | 5/2010 | Lota | B60N 3/101 |
| | | | | 362/154 |
| 8,353,604 | B2* | 1/2013 | Glazier | B60N 3/101 |
| | | | | 362/101 |
| 8,485,680 | B2* | 7/2013 | Anderson | B60N 3/108 |
| | | | | 224/926 |
| 8,870,044 | B1* | 10/2014 | Freese | F16B 2/12 |
| | | | | 224/407 |
| 9,068,708 | B2* | 6/2015 | Antilla | B60N 3/101 |
| 9,381,843 | B2* | 7/2016 | Muiter | B60N 3/108 |
| 2007/0139943 | A1* | 6/2007 | Bone | B60Q 3/0243 |
| | | | | 362/488 |
| 2008/0266853 | A1* | 10/2008 | Goto | B60Q 3/004 |
| | | | | 362/240 |
| 2012/0075842 | A1 | 3/2012 | Goto | |
| 2013/0294105 | A1* | 11/2013 | Reuschel | F21S 8/10 |
| | | | | 362/558 |
| 2015/0175065 | A1* | 6/2015 | Oh | B60N 3/10 |
| | | | | 362/154 |
| 2015/0191116 | A1* | 7/2015 | Forrest | B60Q 3/0243 |
| | | | | 362/516 |

FOREIGN PATENT DOCUMENTS

| | | |
|---|---|---|
| FR | 2924995 | 6/2009 |
| JP | 2002144965 A | 5/2002 |
| JP | 3156996 U | 1/2010 |

OTHER PUBLICATIONS

PCT International Search Report and Written Opinion mailed Jan. 31, 2014.

* cited by examiner

ILLUMINATED CUP HOLDER WITH LIGHT TRANSMISSIVE LINER

CROSS REFERENCE TO RELATED APPLICATION

This application is a national stage of PCT Application No. PCT/US2013/57283, entitled "ILLUMINATED CUP HOLDER ASSEMBLY", filed on Aug. 29, 2013, which claims priority from and the benefit of U.S. Provisional Patent Application Ser. No. 61/695,823, entitled "ILLUMINATED CUP HOLDER ASSEMBLY", filed Aug. 31, 2012. Each of the foregoing applications is hereby incorporated by reference in its entirety.

BACKGROUND

The invention relates generally to vehicle interior components, and more specifically, to an illuminated cup holder assembly.

Cup holders may be positioned throughout a vehicle interior for securing beverage containers. For example, the center console, armrests, door panels, or other interior structures of the vehicle may include one or more cup holders. Certain cup holder configurations include a recess disposed within the interior structure, and a liner inserted within the recess. The liner is configured to secure the beverage container within the recess, thereby limiting movement of the beverage container during vehicle operation. Typical cup holders may accommodate a variety of cups, cans, bottles, and the like.

Certain cup holders include ambient lighting to increase the visibility of the cup holder and/or the beverage container in dark conditions (e.g., while driving at night). For example, certain cup holders may include a lit ring extending about the circumference of the cup holder to enhance the visibility of the cup holder in dark conditions. Unfortunately, employing a lit ring to provide ambient lighting may significantly increase the manufacturing cost of the cup holder assembly.

BRIEF DESCRIPTION OF THE INVENTION

The present invention relates to a cup holder assembly including a liner configured to support a beverage container. The cup holder assembly also includes a light transmissive element disposed within the liner. The light transmissive element is configured to receive light from a light source positioned outwardly from an outer surface of the liner, and to illuminate an inner surface of the liner.

The present invention also relates to a cup holder assembly including a liner having a recess configured to receive a beverage container. The cup holder assembly also includes a substrate configured to support the liner, and a light source coupled to the substrate. The light source is configured to direct light toward an outer surface of the liner. In addition, the cup holder assembly includes a light transmissive element formed within the liner. The light transmissive element is configured to receive light from the light source, and to illuminate an inner surface of the liner.

The present invention further relates to a method of manufacturing a cup holder assembly including injection molding a liner configured to support a beverage container. The method also includes injection molding a light transmissive element into a void in the liner. The light transmissive element is configured to transmit light from an outer surface of the liner to an inner surface of the liner.

DETAILED DESCRIPTION

Figure 1:
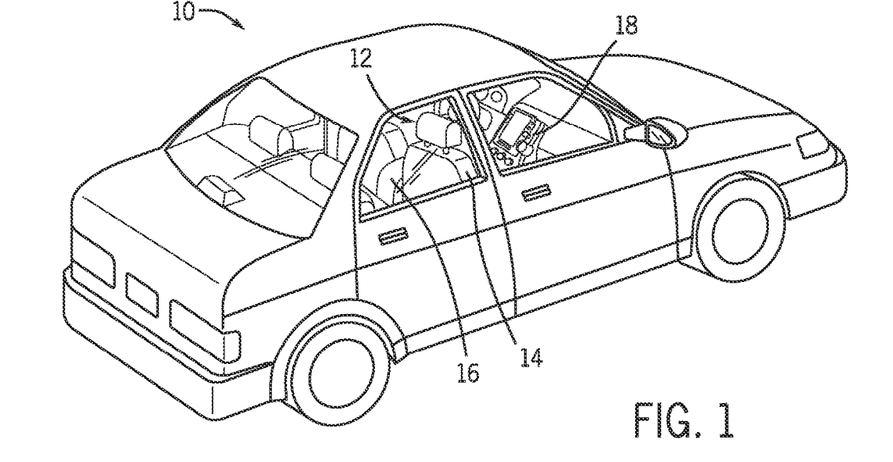
FIG. 1 is a perspective view of an exemplary vehicle that may include an illuminated cup holder assembly.

FIG. 1 is a perspective view of a motor vehicle 10 that may include an illuminated cup holder assembly. As illustrated, the vehicle 10 includes an interior 12 having a seat 14, an armrest 16 and a center console 18. As discussed in detail below, the seat 14, armrest 16, center console 18 and/or other areas within the interior 12 may include cup holders configured to secure beverage containers. In the present embodiment, a cup holder assembly includes a liner having a recess configured to receive a beverage container. In certain embodiments, the liner includes resilient bulbs that flex upon contact with the beverage container. Based on the diameter of the recess and the resilience of the bulbs, the cup holder liner may support a variety of beverage container diameters. For example, as a beverage container is disposed within the recess, contact between the beverage container and the bulbs induces the bulbs to flex toward an inner surface of the liner. As will be appreciated, larger diameter beverage containers induce the bulbs to flex more than smaller diameter beverage containers. As the bulbs flex, a contact force is applied to the beverage container that secures the beverage container within the recess of the liner.

As discussed in detail below, the cup holder assembly may include a light transmissive element formed within the liner, and configured to facilitate illumination of the recess. For example, in certain embodiments, the liner is supported by a substrate having a light source configured to direct light toward an outer surface of the liner. The light transmissive element receives the light from the light source, and transmits the light to an inner surface of the liner, thereby illuminating the recess. As a result, the visibility of the cup holder assembly may be enhanced in low light conditions (e.g., while driving at night). In addition, because the light transmissive element is integrated within the liner, a separate light guide assembly (e.g., a lit ring) is obviated, thereby reducing the manufacturing costs and complexity of the cup holder assembly.

Figure 2:
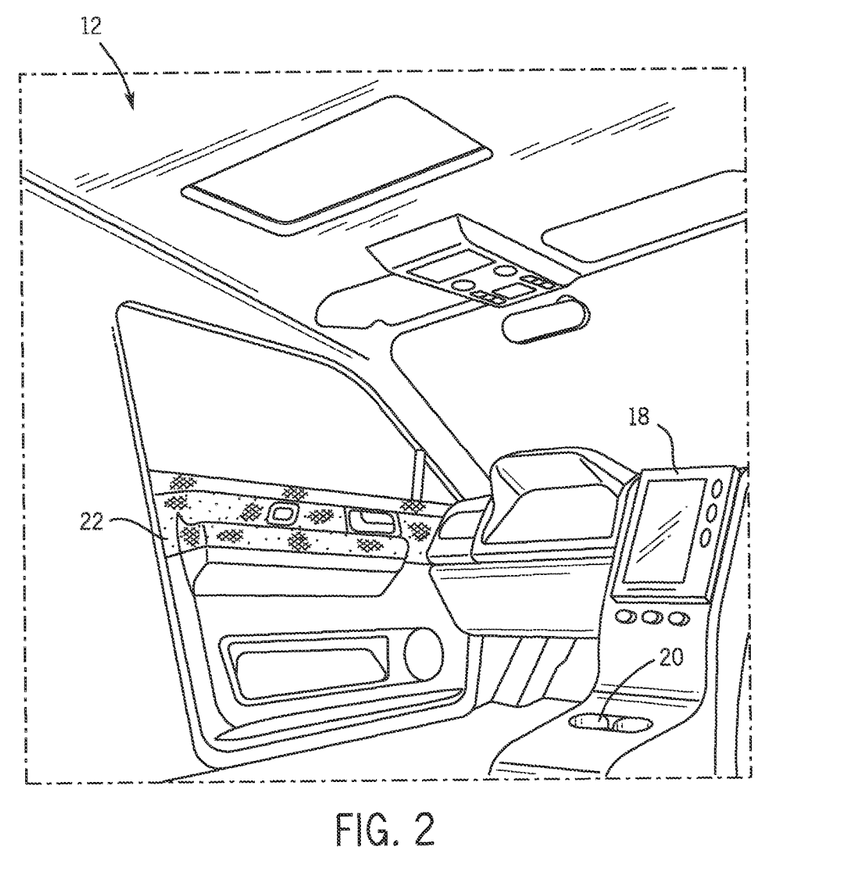
FIG. 2 is a perspective view of a part of the interior of the vehicle of FIG. 1.

FIG. 2 is a perspective view of a part of the interior 12 of the vehicle 10 of FIG. 1. As illustrated, the vehicle interior 12 includes the center console 18 having a cup holder assembly 20. As previously discussed, cup holders may be positioned throughout the interior 12 of the vehicle 10. For example, cup holders may be positioned within an interior door panel 22, an armrest, or within the seats 14. As discussed in detail below, the cup holder assembly 20 includes a liner having a recess configured to receive a beverage container. The cup holder assembly 20 also includes a light transmissive element formed within the liner. The light transmissive element is configured to receive light from a light source positioned outwardly from an outer surface of the liner, and to illuminate an inner surface of the liner. The light emitted from the inner surface of the liner facilitates identification of the cup holder in low light conditions (e.g., while driving at night).

Figure 3:
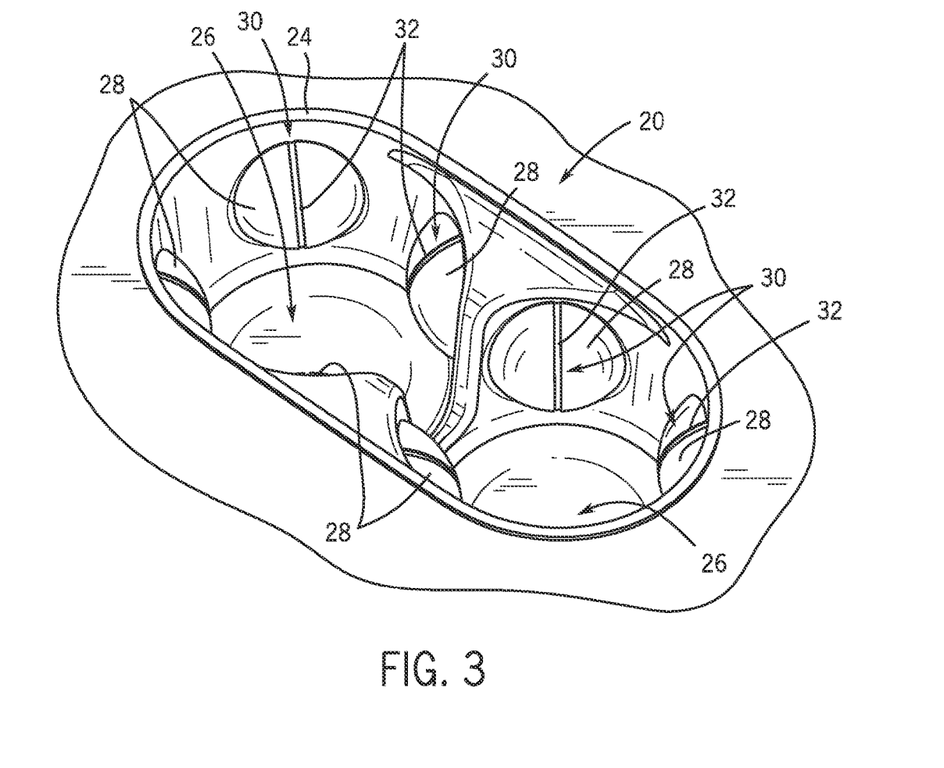
FIG. 3 is a perspective view of an embodiment of a cup holder assembly having a liner configured to retain a beverage container.

FIG. 3 is a perspective view of an embodiment of a cup holder assembly 20 having a liner configured to retain a beverage container. As discussed in detail below, the cup holder liner 24 is configured to accommodate beverage containers having a variety of diameters. In certain embodiments, the cup holder liner 24 is formed from a thermoplastic elastomer (e.g., polyolefin). As will be appreciated, the hardness of the cup holder liner 24 may be characterized by the resistance to indentation, otherwise referred to as Durometer, denoted in the Shore A scale, for example. Within the Durometer scale, materials are generally characterized based on ranges. Hard elastomers generally include those having a Durometer greater than about 80 Shore A, soft elastomers generally include those having a Durometer of about 60 Shore A to about 80 Shore A, and super-soft elastomers generally include those having a Durometer below about 60 Shore A. In certain embodiments, the cup holder liner 24 may be composed of a material having a Durometer of approximately between 70 to 80 Shore A.

The illustrated cup holder liner 24 includes two recesses 26, each configured to receive and support a beverage container. As will be appreciated, alternative embodiments may include more or fewer recesses 26. For example, certain embodiments may include 1, 2, 3, 4, 5, 6, or more recesses 26 configured to receive a corresponding number of beverage containers. In the present embodiment, each recess 26 includes four resilient substantially hemispherical bulbs 28 disposed on an inner surface of the recess 26. The bulbs 28 are configured to deform to accommodate various beverage container diameters. While four bulbs 28 are employed for each recess 26 in the present embodiment, it should be appreciated that alternative embodiments may include more or fewer bulbs 28. For example, certain embodiments may include 1, 2, 3, 4, 5, 6, or more bulbs 28 per recess 26.

In the illustrated embodiment, each bulb 28 includes a recessed region 30 configured to facilitate deformation of the resilient bulb 28. The recessed region 30 is formed from thinner material than the surrounding structure of the bulb, thereby enabling the bulb to flex along the recessed region 30. While each bulb 28 includes a single recessed region 30 in the illustrated embodiment, it should be appreciated that each bulb 28 may include more or fewer recessed regions 30 in alternative embodiments. For example, certain bulbs may include 0, 1, 2, 3, 4, 5, or more recessed regions to control deformation of the bulb.

In the illustrated embodiment, a light transmissive element 32 is disposed within the recessed region 30 of the bulb 28. As discussed in detail below, the light transmissive element 32 is configured to receive light from a light source positioned outwardly from an outer surface of the liner 24, and to illuminate an inner surface of the liner 24. The light emitted from the inner surface of the light transmissive element facilitates identification of the cup holder assembly 20 in low light conditions (e.g., while driving at night). In addition, because the light transmissive element 32 is integrated within the liner 24, a separate light guide assembly (e.g., a lit ring) is obviated, thereby reducing the manufacturing costs and complexity of the cup holder assembly.

In certain embodiments, the light transmissive element 32 is inserted within an opening in the liner 24, and then secured to the liner (e.g., via an adhesive connection). In further embodiments, the liner 24 and the light transmissive element 32 are integrally formed by an injection molding process (e.g., from a thermoplastic elastomer). In such embodiments, the inner surface of the liner 24 may be substantially continuous to establish a substantially liquid-tight barrier. Accordingly, liquids that spill and/or leak from the beverage container may be substantially contained within the cup holder liner 24.

While each light transmissive element 32 is formed within the recessed region 30 of a respective bulb 28 in the illustrated embodiment, it should be appreciated that the light transmissive elements 32 may be formed within other regions of the liner 24. For example, as discussed in detail below, one or more light transmissive elements may be formed within the main structure of each bulb (e.g., extending across the recessed region). For example, certain bulbs may include 1, 2, 3, 4, 5, 6, or more light transmissive elements. In addition, light transmissive elements may be formed between the bulbs, above the bulbs, and/or below the bulbs of the liner 24. Moreover, while the light transmissive elements are oriented substantially vertically in the illustrated embodiment, it should be appreciated that certain embodiments may include substantially horizontal, and/or angled light transmissive elements. Furthermore, it should be appreciated that the light transmissive elements may be formed in a variety of suitable shapes, such as squares, circles, and polygons, among others.

Figure 4:
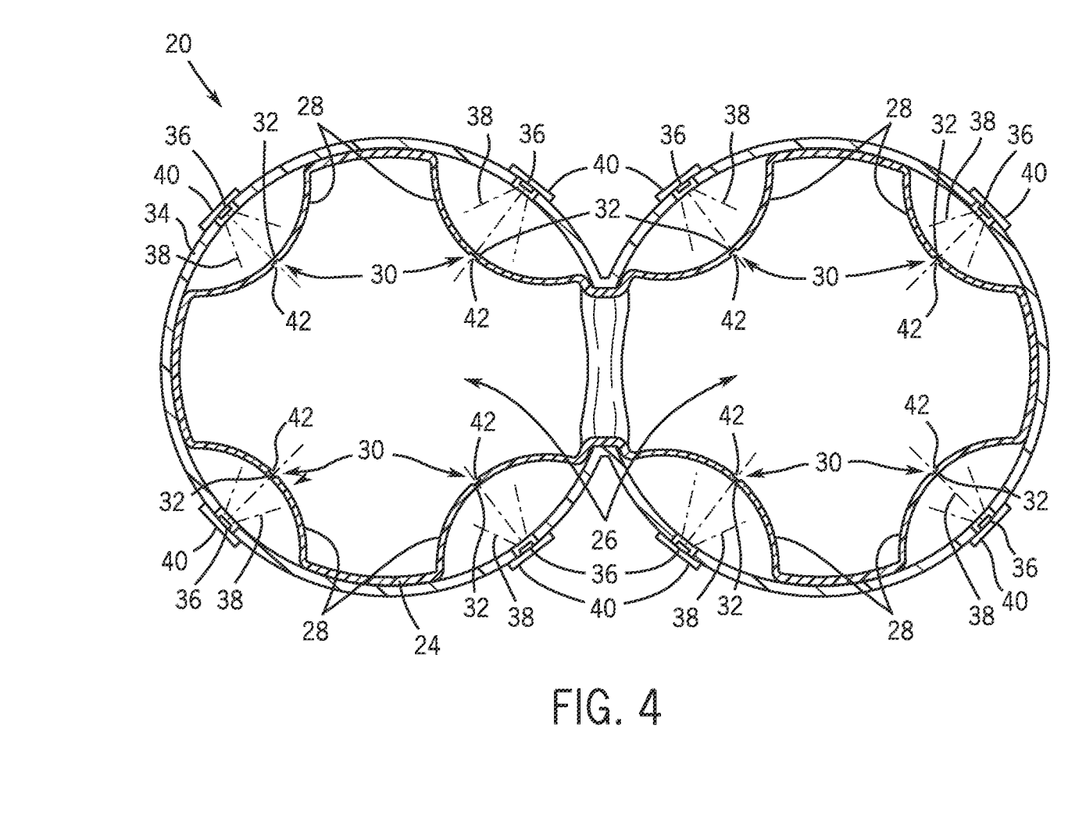
FIG. 4 is a cross-sectional view of the cup holder assembly of FIG. 3.

FIG. 4 is a cross-sectional view of the cup holder assembly 20 of FIG. 3. As illustrated, the cup holder assembly 20 includes a substrate 34 configured to support the liner 24. Light sources 36 are coupled to the substrate 34, and configured to direct light toward an outer surface of the liner 24. In the illustrated embodiment, each light source 36 is configured to direct light 38 toward a respective light transmissive element 32. Each light transmissive element 32 is configured to receive light from the light source 36, and to illuminate an inner surface of the liner. As previously discussed, the light emitted from the inner surface of the liner facilitates identification of the cup holder in low light conditions (e.g., while driving at night).

The illustrated embodiment includes eight light sources 36 configured to illuminate eight corresponding light transmissive elements 32. However, it should be appreciated that more or fewer light sources and/or light transmissive elements may be employed in alternative embodiments. For example, in certain embodiments, multiple light sources (e.g., 2, 3, 4, or more) may direct light to each light transmissive element. Alternatively, one light source may illuminate multiple (e.g., 2, 3, 4, or more) light transmissive elements. For example, the cup holder assembly 20 may include a light guide or fiber optic cable configured to direct light from a single light source to multiple light transmissive elements.

As will be appreciated, the light sources may be any suitable device configured to emit sufficient light to illuminate the light transmissive elements, such as a light emitting diode (LED), incandescent bulb, or a fluorescent bulb, for example. In certain embodiments, the light sources may be selected to have substantially similar colors and/or intensities (e.g., selected from the same bin). Consequently, the illuminated surfaces may provide substantially uniform lighting.

As illustrated, the substrate 34 includes openings configured to accommodate the light sources 36. In certain embodiments, the openings may be sealed to block liquid flow from the substrate 34. For example, each light source 36 may include a lens configured to direct the light 38 toward the light transmissive element 32. In such a configuration, each lens may be sealed to the substrate 34 (e.g., via an adhesive connection) to block liquid flow through the openings. In further embodiments, a light guide may extend through the opening to transmit light from a remote light source to the light transmissive element 32. In such embodiments, the light guide may be sealed to the opening (e.g., via a gasket) to block liquid flow from the substrate 34.

In the illustrated embodiment, each light source 36 is mounted to a circuit board 40. In certain embodiments, each circuit board 40 may include control circuitry configured to drive the light source. Alternatively, each circuit board 40 may be communicatively coupled to a main circuit board (e.g., positioned remote from the cup holder assembly) having control circuitry configured to drive each light source. In certain embodiments, the control circuitry (e.g., on the main circuit board or distributed across the circuit boards 40) is configured to selectively emit light from each light source in a desired pattern. For example, the control circuitry may illuminate the light sources in a sequential pattern about the receptacle, thereby providing a marquee lighting effect. As will be appreciated, the control circuitry may be configured to illuminate the light sources in alternative patterns, thereby producing a variety of lighting effects. In addition, the control circuitry may be configured to vary the intensity, frequency and/or color of each light source. For example, each light source may include a tricolor LED configured to emit a variety of colors via a combination of red, green and blue color elements. In such a configuration, a color of the light transmissive elements may be particular adjusted based on user input, for example. Furthermore, the control circuitry may include a dimming feature to adjust lighting intensity, and/or voltage conditioning elements to provide a desired voltage to the light sources.

In further embodiments, the cup holder assembly 20 may include a sensor communicatively coupled to the control circuitry. The sensor is configured to output a signal indicative of presence of an activating object, temperature of the activating object and/or ambient temperature. The control circuitry, in turn, is configured to adjust a color, intensity and/or frequency of the light emitted from each light source based on the signal. For example, the sensor may be a thermocouple imbedded within the liner. In such an embodiment, the sensor outputs a signal indicative of a beverage container temperature to the control circuitry. The control circuitry then adjusts the color emitted by each light source based on the detected temperature. For example, if a cold beverage is placed within the cup holder receptacle, the light transmissive elements may emit blue light, and if a hot beverage is placed within the cup holder receptacle, the light transmissive elements may emit red light. Similarly, the color of the light sources may be adjusted based on a detected ambient temperature within the vehicle interior. In certain embodiments, the cup holder assembly 20 is configured to actively heat or cool the beverage container (e.g., by directing heated or cooled air from the HVAC system to the cup holder assembly 20). In such embodiments, the control circuitry may instruct each light source to emit red light if the beverage container is being actively heated, and to emit blue light if the beverage container is being actively cooled.

The sensor may also be configured to detect the presence of an activating object (e.g., keys, sunglasses, coins, food/beverage containers, etc.) within the cup holder assembly 20. If the object is detected, the control circuitry instructs each light source to decrease luminous intensity or completely darken. In this manner, light reflected from the object within the cup holder may be significantly reduced or eliminated, thereby reducing driver distraction. Furthermore, once the sensor has detected that the object has been removed from the cup holder, the control circuitry instructs the light sources to return to the initial illuminated state, thereby facilitating identification of the cup holder assembly in low light situations. In alternative embodiments, the control circuitry may be configured to instruct the light sources to increase luminous intensity, vary the color and/or vary the frequency of the emitted light upon detection of an activating object.

In addition, the inner surface of the light transmissive element 32 may be coated with a reflective material 42 to enhance visibility of the recess 26 in daylight conditions. For example, the light transmissive element 32 may include a chrome coating over the inner surface. Such a coating may be configured to facilitate light passage from the light transmissive element, thereby maintaining visibility of the recess 26 in low light conditions. It should also be appreciated that alternative light transmissive colored and/or textured coatings may be applied in alternative embodiments to enhance the appearance of the recess 26. In addition, it should be appreciated that the light transmissive element 32 may be tinted to provide a desired illuminated color. For example, if blue light is desired and white light is emitted from the light source, the light transmissive element 32 may be tinted blue to provide the desired appearance. In further embodiments, the light transmissive element 32 may be tinted the same color as the liner to enhance the appearance of the cup holder assembly.

While the liner described herein substantially covers an inner surface of the substrate, it should be appreciated that, in alternative embodiments, the liner may extend across a portion of the inner surface of the substrate. For example, in certain embodiments, the liner may include a base and walls extending upwardly from the base. The walls may extend along a portion of the vertical extent of the substrate. For example, a vertical extent of the walls may be about 5 percent to about 100 percent, about 10 percent to about 90 percent, about 20 percent to about 80 percent, or about 30 percent to about 70 percent of the vertical extent of the substrate. In further embodiments, the liner may be substantially flat and configured to cover a bottom portion of the substrate. In such embodiments, the liner is configured to support a beverage container within the substrate (e.g., by providing a high-friction bottom surface). In addition, the light transmissive element may extend across a portion of the substantially flat liner, thereby facilitating illumination of a bottom portion of the cup holder assembly (e.g., via a light source positioned beneath the liner).

Furthermore, while the lighting system (e.g., light source, light transmissive element, etc.) is described herein with reference to a cup holder assembly, it should be appreciated that the lighting system may be employed within other retaining assemblies of the vehicle interior. For example, the vehicle may include a receptacle configured to retain a portable electronic device, and a flexible liner configured to secure the portable electronic device within the receptacle. In such a configuration, a lighting system may be configured to emit light from the flexible liner to facilitate identification of the receptacle in low light conditions.

Figure 5:
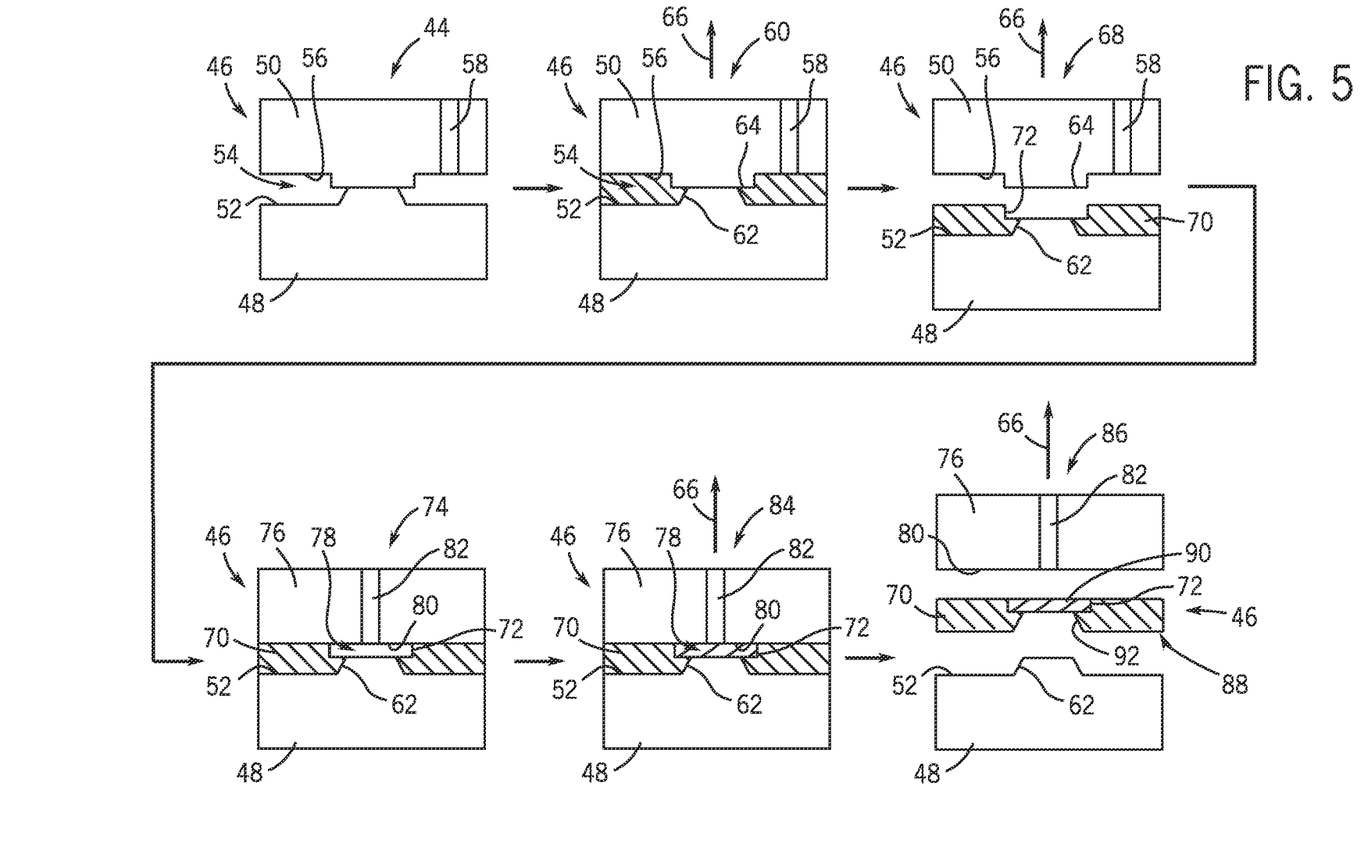
FIG. 5 is a schematic flow diagram of an embodiment of a method of manufacturing a cup holder assembly.

FIG. 5 is a schematic flow diagram of an embodiment of a method of manufacturing a cup holder assembly. First, as represented by step 44, a mold assembly 46 is transitioned to a closed position. As illustrated, the mold assembly 46 includes a first mold element 48 (e.g., a lower mold element), and a second mold element 50 (e.g., an upper mold element). With the mold assembly 46 in the closed position, a surface of the first mold element 48 forms a first surface 52 of a first mold cavity 54, and a surface of the second mold element 50 forms a second surface 56 of the first mold cavity 54. As discussed in detail below, resin (e.g., a thermoplastic elastomer) may be injected into the first mold cavity 54 (e.g., through a flow path 58 in the second mold element 50) to form the cup holder liner.

Next, as represented by step 60, resin is injected into the mold cavity 54 to form the liner. As illustrated, the first mold element 48 includes a first protrusion 62, and the second mold element 50 includes a second protrusion 64. The first protrusion 62 is configured to establish a recessed region that facilitates deformation of the liner, such as the recessed region 30 in the resilient bulb 28. The second protrusion 64 is configured to establish a void configured to facilitate formation of the light transmissive element. After the resin cures and/or hardens, the second mold element 50 moves away from the first mold element in the direction 66, as represented by step 68. As illustrated, the first injection of resin forms a resin structure 70 of the liner. As discussed in detail below, additional resin may be injected into the void 72 of the liner structure 70 to form the light transmissive element.

As represented by step 74, a third mold element 76 is positioned adjacent to the first mold element 48 to form the light transmissive element. As illustrated, a surface of the first mold element 48 forms a first surface 52 of a second mold cavity 78, and a surface of the third mold element 76 forms a second surface 80 of the second mold cavity 78. As discussed in detail below, light transmissive resin (e.g., a thermoplastic elastomer) may be injected into the second mold cavity 78 (e.g., through a flow path 82 in the third mold element 76) to fill the void 72, thereby forming the light transmissive element.

Next, as represented by step 84, resin is injected into the second mold cavity 78 to form the light transmissive element. After the resin cures and/or hardens, the third mold element 76 moves away from the first mold element 48 in the direction 66, as represented by step 86. As a result of the molding process, a cup holder liner 88 is formed. Specifically, the second injection of resin forms a light transmissive element 90 within the void 72 of the liner structure 70. As previously discussed, the light transmissive element is configured to receive light from a light source positioned outwardly from an outer surface of the liner, and to illuminate an inner surface of the liner. The light emitted from the inner surface of the liner facilitates identification of the cup holder in low light conditions (e.g., while driving at night). In the illustrated embodiment, the light transmissive element 90 is formed within a recessed region 92 configured to facilitate deformation of the liner. However, it should be appreciated that the light transmissive element may be formed within other regions of the liner structure. For example, as discussed in detail below, one or more light transmissive elements may be formed within the main structure of each bulb (e.g., extending across the recessed region). In addition, light transmissive elements may be formed between the bulbs, above the bulbs, and/or below the bulbs of the liner.

Figure 6:
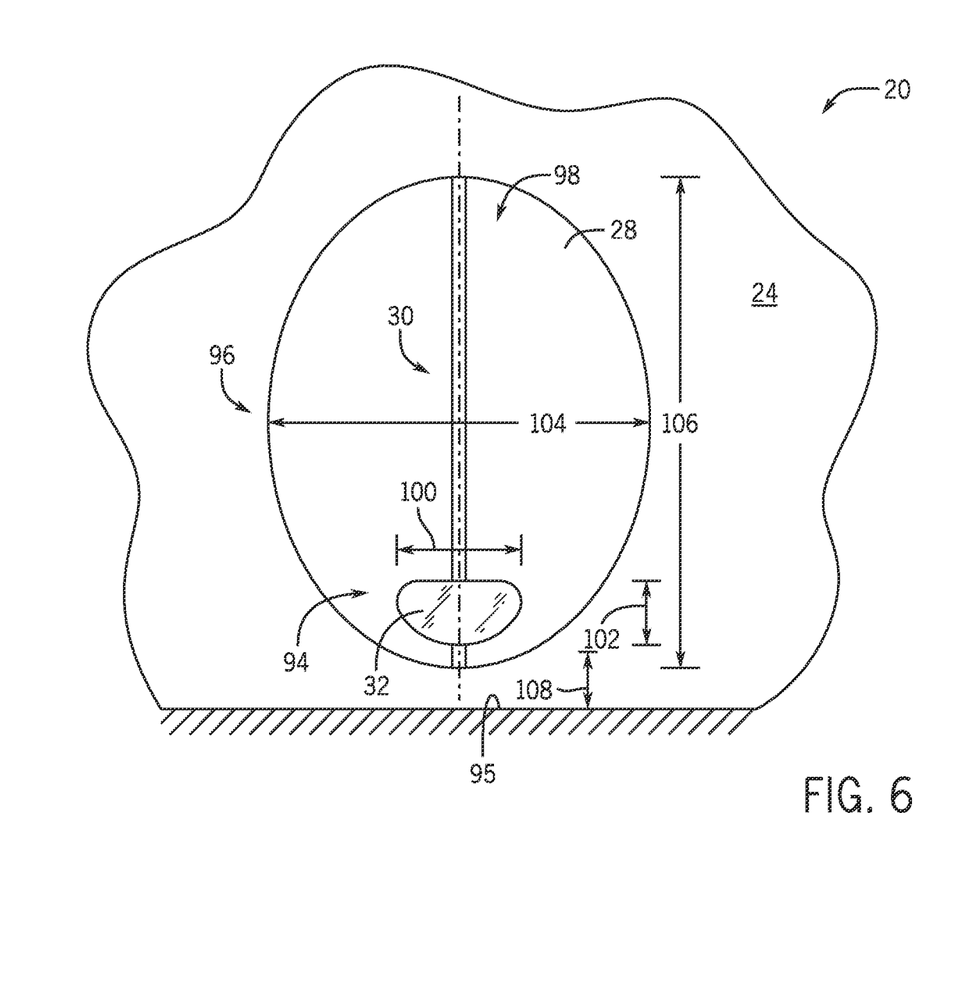
FIG. 6 is a partial front view of an embodiment of a cup holder liner having a resilient bulb that includes a light transmissive element.

FIG. 6 is a partial front view of an embodiment of a cup holder liner 24 having a resilient bulb 28 that includes a light transmissive element 32. In the illustrated embodiment, the light transmissive element 32 is formed within the main structure of the bulb 28 and extends across the recessed region 30. However, in alternative embodiments, the light transmissive element 32 may be positioned on either lateral side of the recessed region 30. Furthermore, as illustrated, the light transmissive element 32 is positioned within a lower portion 94 of the bulb 28 (e.g., proximate to the base 95 of the cup holder liner 24). In this position, the light transmissive element 32 facilitates illumination of the base 95 of the liner 24, thereby enhancing visibility of the cup holder assembly in low light conditions (e.g., while driving at night). In addition, due to the curvature of the lower portion 94 of the bulb 28, the light transmissive element 32 may direct light away from the vehicle interior, thereby enabling a driver to focus on the surrounding environment. While the light transmissive element 32 is positioned within the lower portion 94 of the bulb 28 in the illustrated embodiment, it should be appreciated that, in alternative embodiments, the light transmissive element 32 may be positioned within a central portion 96 of the bulb 28 or within an upper portion 98 of the bulb 28.

In the illustrated embodiment, the light transmissive element 32 is formed into a substantially semi-circular shape. However, it should be appreciated that, in alternative embodiments, the light transmissive element may be formed into a circular, elliptical, or a polygonal shape, among others. In addition, a width 100 and a height 102 of the light transmissive element 32 may be particularly selected to provide the desired illumination. For example, in the illustrated embodiment, the width 100 of the light transmissive element 32 is approximately 50 percent of a width 104 of the resilient bulb 28. However, it should be appreciated that, in alternative embodiments, the width 100 may be about 10 percent to about 90 percent, about 20 percent to about 80 percent, or about 30 percent to about 70 percent of the width 104 of the bulb 28. In addition, the height 102 of the light transmissive element 32 is approximately 10 percent of a height 106 of the resilient bulb 28. However, it should be appreciated that, in alternative embodiments, the height 102 may be about 5 percent to about 95 percent, about 10 percent to about 90 percent, or about 20 percent to about 80 percent of the height 106 of the bulb 28. Furthermore, a distance 108 between the light transmissive element 32 and the base 95 of the liner 24 may be particularly selected to provide the desired light effect.

Figure 7:
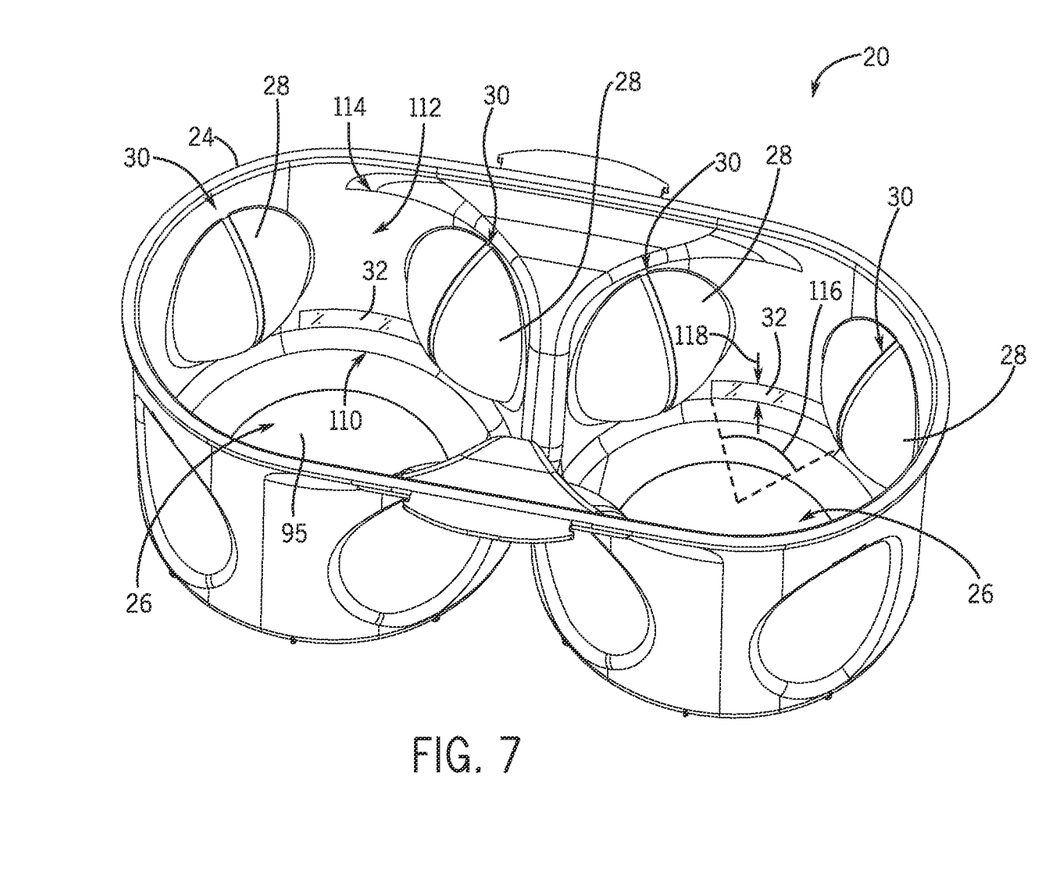
FIG. 7 is a perspective view of an alternative embodiment of a cup holder assembly having a liner configured to retain a beverage container.

FIG. 7 is a perspective view of an alternative embodiment of a cup holder assembly 20 having a liner 24 configured to retain a beverage container. In the illustrated embodiment, the light transmissive elements 32 are formed in the body of the liner 24 between adjacent resilient bulbs 28. As illustrated, the light transmissive elements 32 are positioned within a lower portion 110 of the cup holder liner 24 (e.g., proximate to the base 95 of the liner 24). In this position, the light transmissive elements 32 facilitate illumination of the base 95 of the liner 24, thereby enhancing visibility of the cup holder assembly in low light conditions (e.g., while driving at night). In addition, the light transmissive elements 32 may direct light away from the vehicle interior, thereby enabling a driver to focus on the surrounding environment. However, it should be appreciated that, in alternative embodiments, the light transmissive elements 32 may be positioned within a central portion 112 of the liner 24 or within an upper portion 114 of the liner 24. Furthermore, in certain embodiments, the light transmissive elements 32 may be positioned below the bulbs 28 and/or above the bulbs. In addition, a width 116 and a height 118 of the light transmissive elements 32 may be particularly selected to provide the desired illumination.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A holder assembly for a container provided in a form having a profile comprising:
    a liner configured to support the container comprising an inner surface providing a base, an opening with a perimeter and a recess; and
    a resilient element comprising a light transmissive element within the liner;
    wherein the resilient element with the light transmissive element is configured to deform to the form of the container to be supported in the liner;
    wherein the light transmissive element is configured to transmit light to illuminate the inner surface of the liner;
    wherein the profile of the container comprises an effective diameter;
    wherein the resilient element with the light transmissive element comprises a resilient bulb in the recess;
    wherein the recess is configured to receive the container;
    wherein the resilient element is configured to deform to accommodate the effective diameter of the container; and
    wherein the effective diameter accommodated in the recess may be one of various container diameters.

2. The holder assembly of claim 1 wherein the resilient element comprises a recessed region configured to facilitate deformation of the resilient element; and wherein the light transmissive element is formed within the recessed region.

3. The holder assembly of claim 1 wherein the liner comprises a pair of resilient bulbs; and wherein the light transmissive element is between the pair of resilient bulbs.

4. The holder assembly of claim 1 wherein the light transmissive element is (a) integrally formed by an injection molding process with the liner, (b) inserted into an opening in the liner, (c) inserted with the resilient element in the liner, and (d) injection molded into a void in the liner.

5. A holder assembly for a container provided in a form having a profile comprising:
    a liner having a recess between a base and an opening configured to receive the container;
    a substrate at the base configured to support the liner; and
    a resilient element comprising a light transmissive element formed within the liner;
    wherein the light transmissive element is configured to transmit light from a light source and to illuminate the liner;
    wherein the resilient element with the light transmissive element is configured to deform to accommodate the form of the container.

6. The holder assembly of claim 5 wherein the liner and the resilient element are integrally formed by an injection molding process.

7. The holder assembly of claim 5 comprising a reflective coating disposed onto an inner surface of the light transmissive element; wherein the reflective coating is configured to facilitate light passage from the light transmissive element.

8. The holder assembly of claim 5 wherein the resilient element comprises at least one of (a) a resilient bulb, (b) a flexible bulb, (c) a recessed region, (d) a deformable surface, (e) a substantially hemispherical bulb; and wherein the light transmissive element comprises at least one of (a) a recessed region of the resilient element, (b) a coating to enhance visibility of the light transmissive element, (c) tinting to provide a desired illuminated color.

9. The holder assembly of claim 5 wherein the profile of the container comprises an effective diameter of the container; wherein the resilient element of the liner comprises a resilient bulb extending into the recess adjacent to the base; and wherein the resilient bulb is configured to deform to accommodate the effective diameter of the container; wherein the container may be one of a group of containers with various accommodated effective diameters.

10. The holder assembly of claim 9 wherein the resilient bulb includes the light transmissive element.

* * * * *